GOTY & GUILLEMIN.
Mode of Utilizing Tinner's Waste.
No. 57,252. Patented Aug. 14, 1866.
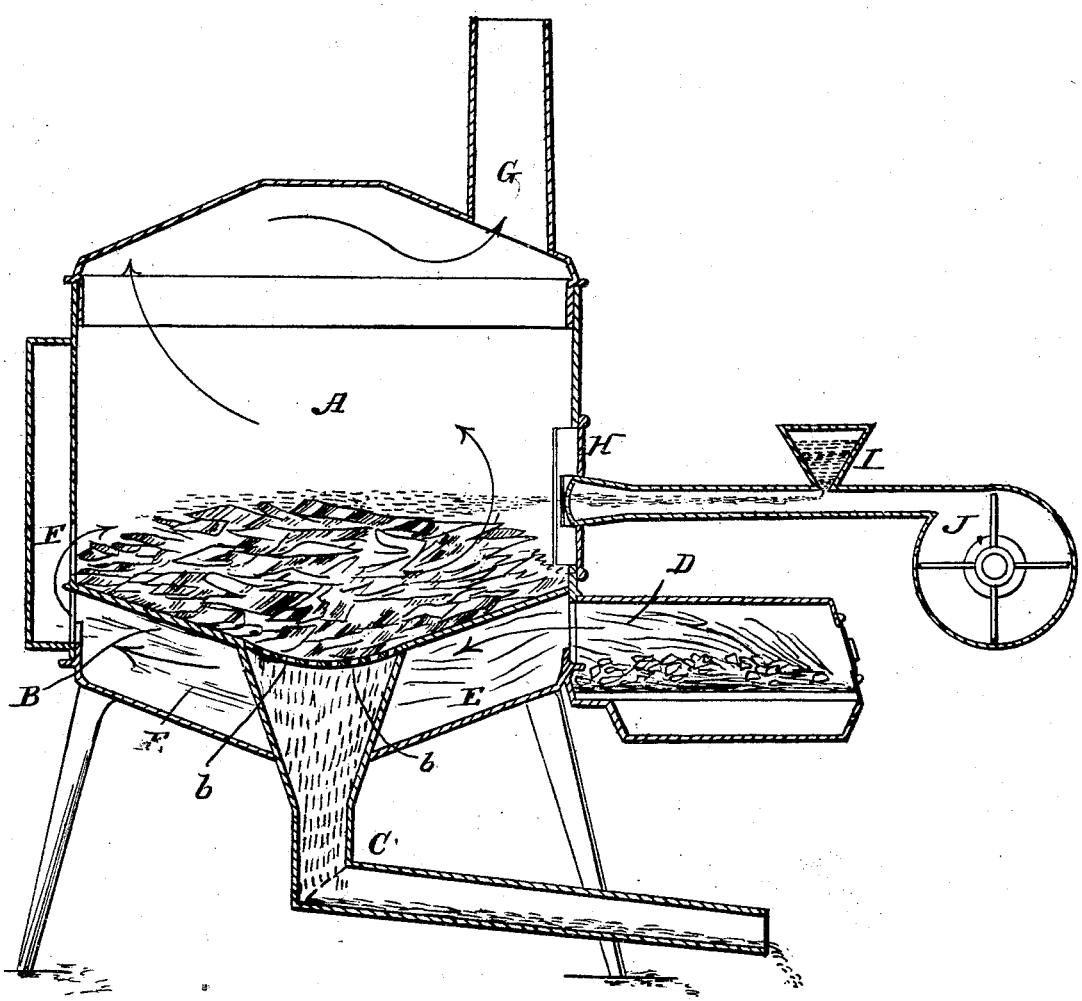

UNITED STATES PATENT OFFICE.

CHAS. GOTY AND AUGTE. GUILLEMIN, OF CINCINNATI, OHIO, ASSIGNORS TO THEMSELVES, CHARLES FIX, AND JOSEPH OPPENHEIMER.

IMPROVED MODE OF UTILIZING TINNERS' WASTE.

Specification forming part of Letters Patent No. 57,252, dated August 14, 1866.

*To all whom it may concern:*

Be it known that we, CHARLES GOTY and AUGUSTE GUILLEMIN, both of Cincinnati, Hamilton county, Ohio, have invented a new and useful Mode of Utilizing Tinners'-Waste; and we do hereby declare the following to be a full, clear, and exact description thereof, reference being had to the accompanying drawing, making part of this specification.

Our invention relates, first, to a mode or process for the separation of the tin-coating from the scraps or refuse pieces of a tin-shop; and, secondly, to a construction of furnace within which to effect such separation.

A is a reverberating-oven, constructed of cast or wrought iron, and having a dished bottom, B, whose central and lowest portion has numerous apertures $b$, which conduct the melted tin into a spout, C.

D is a fire-box, whose flue E extends under the entire bottom of the oven, which it enters near its lower part at F, and reverberating through the same escapes at the chimney G.

A door, H, enables the insertion of the scraps into the oven.

I is a hopper for containing our deflagrating and fluxing powders, and communicates with a blower, J, whose ventage $j$ enters the door H or other portion of the side of the oven.

Operation: The fire being started, the oven is to be supplied with tin scraps—say about two hundred pounds in weight—which, being heated to redness, about half a pound of our powder is thrown in the hopper and immediately blown into the oven, resulting in a violent deflagration and a flux of the tin, which runs off through the apertures $b$ and into the spout C. A second and then a third handful of the powder, applied at intervals of a few seconds, the scraps being stirred in the intervals, commonly suffices to detach the entire body of tin and to cause it to run off.

When once heated and fused in the manner described the tin separates and runs off in a body.

Our deflagrating and fluxing powder is composed of two parts, by weight, of rosin, and of one part lycopodium, of which substances the latter acts by the momentary searching and intense heat of its rapid combustion, while the rosin serves the purpose of a flux and acts to retain the tin in a highly-liquid state, without sublimation, until it escapes from the oven.

We claim herein as new and of our invention—

1. The process of removing tin from iron, substantially as set forth.

2. The furnace substantially as described, and for the purpose set forth.

In testimony of which invention we hereunto set our hands.

CHARLES GOTY.
AUGUSTE GUILLEMIN.

Witnesses:
EDWARD HUSER,
GEORGE H. KNIGHT.